(No Model.)
F. O. DESCHAMPS.
SHAFT COUPLER.
No. 269,836. Patented Jan. 2, 1883.
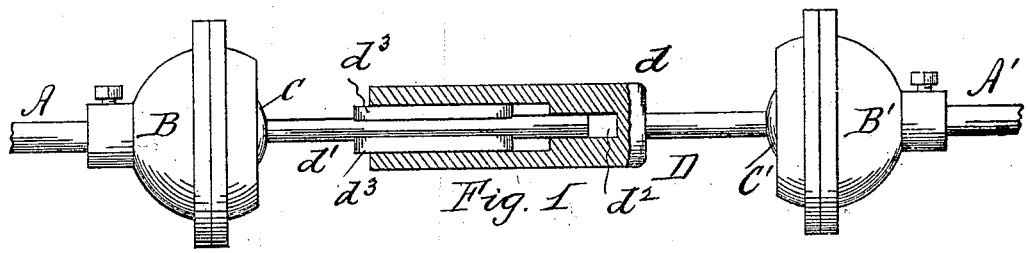
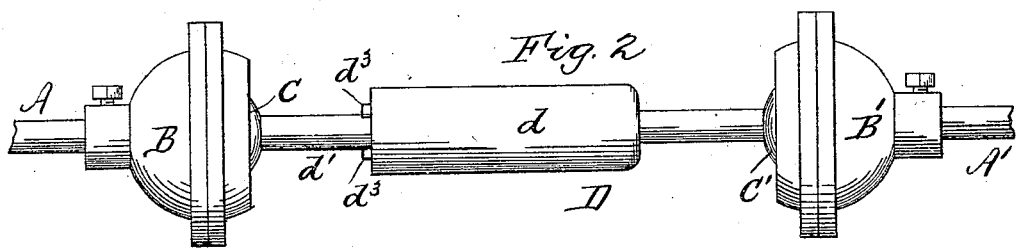
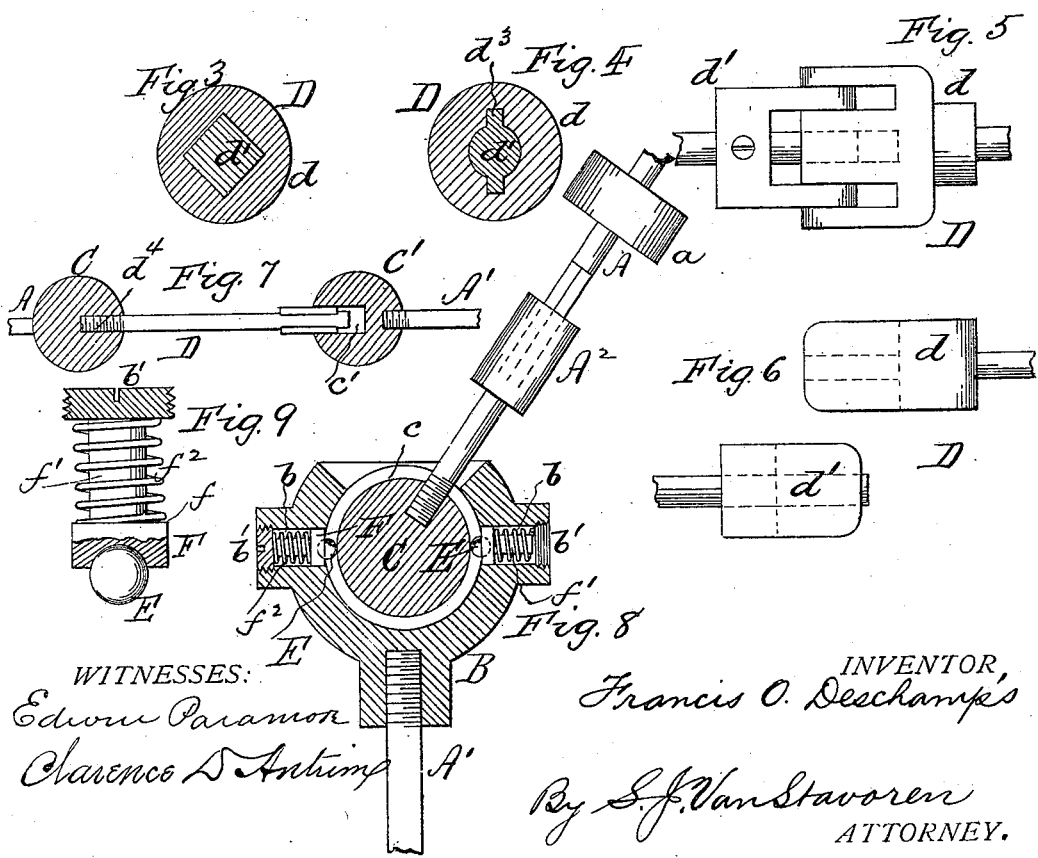
WITNESSES:
Edwin Paramon
Clarence D Antrim
INVENTOR,
Francis O. Deschamps
By S. J. Van Stavoren
ATTORNEY.

UNITED STATES PATENT OFFICE.

FRANCIS O. DESCHAMPS, OF PHILADELPHIA, PENNSYLVANIA.

SHAFT-COUPLER.

SPECIFICATION forming part of Letters Patent No. 269,836, dated January 2, 1883.

Application filed March 13, 1882. (No model.)

*To all whom it may concern:*

Be it known that I, FRANCIS O. DESCHAMPS, a citizen of the United States, and a resident of the city and county of Philadelphia, in the State of Pennsylvania, have invented certain new and useful Improvements in Shaft-Couplers, of which the following is a specification, reference being had to the accompanying drawings, wherein—

Figure 1 is a longitudinal vertical section of a shaft-coupler connecting-rod embodying my improvements. Fig. 2 is an elevation of the same. Figs. 3 and 4 are transverse detail sections. Figs. 5 and 6 are detail elevations. Fig. 7 is a sectional modification. Fig. 8 is a section through the coupler; and Fig. 9 is a detail plan, partly in section, of coupling-key and holder therefor.

My invention has relation to that class of shaft-couplers in which a ball and socket is used for coupling the shafts together, and has for its object to provide an automatically yielding or adjustable connection between the ball of the driver and that of the driven shaft, whereby the longitudinal vibrations of the coupled shafts are absorbed or taken up by said yielding connection, and the binding of the balls within their couplers is thereby prevented during such longitudinal movement of the coupled shafts, such binding heretofore taking place when said balls were connected by a rigid or unyielding connecting-rod. The provision of such self-adjusting connecting-rod also facilitates the operation of setting the couplers and lining up the shafts to which the couplers are connected.

My invention has for its further object to improve the construction of the couplers, as hereinafter explained.

My invention accordingly consists in connecting the ball of the driver with that of the driven shaft by means of a rod or connection capable of a longitudinal movement, and of the novel construction of the coupler, as hereinafter specifically described and claimed.

Referring to the accompanying drawings, A and A' represent the driver and driven shaft, respectively, each of which is provided with a ball-and-socket coupling, as shown. The sockets B B' are secured to their respective shafts, as illustrated, and the balls C C' are connected together by a rod or connection, D. The latter is formed in two parts, $d$ and $d'$, which telescope into one another, as indicated, so as to leave a play-space, $d^2$. Said parts or sections of rod D may be rectangular in form, as shown in Fig. 3, or they may be circular in outline, and one section be provided with one or more feathers, $d^3$ $d^3$, which fit into corresponding recesses in the other section, as indicated in Figs. 1 and 4; or they may be formed with interlocking lugs, as shown in Figs. 5 and 6, or the said sections may be formed and connected together in any other desired or suitable manner which will permit of their yielding or sliding together in the direction of their length, the result whereof is that in setting the couplers in position on the shafts designed to be coupled, or in lining up said shafts the latter may be secured in their bearings, leveled up, and the sockets of the coupler attached thereto before placing the balls and connecting-rod in position, as the telescoping of the sections of said rod permits the balls to come together to such extent that they may be readily inserted in their sockets. When said parts are so secured together any longitudinal vibration or end-thrust of the shafts is taken up by the telescoping of the sections of the rod D, without in any manner causing a binding action of the balls within their sockets, while heretofore, when such balls were connected by a rigid rod, they had to be placed in their sockets before the shafts were lined up, which operation was then performed, and required considerable skill on the part of the workmen to effect the proper adjustments of said shafts, sockets, balls, and connecting-rod, so that the balls would run easily in their sockets. When such adjustments were obtained any longitudinal vibration or end-thrust of the shafts caused the balls to bind in their sockets, thereby causing a rapid deterioration of their wearing-surfaces and a waste of the additional power required to overcome said binding action.

E E represent the keys or small spheres for locking the balls in the sockets, so as to cause a simultaneous movement of said parts. Said balls or spheres E E enter cups F F, which are provided with shoulders $f$, shanks $f'$, and encircling spiral or other springs $f^2$. Said parts are held in position within the openings $b$ of the sockets by means of an abutting-screw, $b'$, the effect whereof is that as the spheres E E wear and tend to have lost motion in the grooves c of the balls such lost motion is taken up by the expansion of the springs $f^2$. Any undue wear of said spheres is overcome by screwing up the abutting-screws $b'$. Hence the spheres E E are always held in position within the coupler, so as not to have lost motion therein. Consequently there is no looseness of the balls C C' within the sockets B B', and the parts of the coupler revolve with great and undeviating regularity.

I have shown and described the rod D as being made of two sections and so connected together that they will be capable of longitudinal movement; but, if desired, said rod may be of one piece throughout, rigidly connected to the ball C of one of the couplers at one end, its opposite end loosely entering an opening in the ball C' of the remaining coupler, such opening being of sufficient length to provide for play-space for said rod therein. Such construction is shown in Fig. 7, wherein D is the connecting-rod between the balls C and C', and is represented as being in one piece, its end $d^4$ being rigidly secured to ball C, and its opposite extremity entering opening $c'$ in ball C', and has liberty of axial movement therein, so as to take up the longitudinal vibrations or end-thrusts of the shafts A A'.

In Fig. 8 the driving-shaft A is represented as being divided at $A^2$ and its sections telescoping, as above described for the connecting-rod D; and $a$ is the pulley or gear-wheel secured thereto. In the arrangement shown in said figure the connecting-rod D is dispensed with, the shaft A being secured to ball C and shaft A' to socket B. Consequently either the shaft A or A' must be arranged to yield, as above set forth.

What I claim as my invention is—

1. The combination, with two shafts designed to be coupled together by a ball-and-socket coupler secured to each such shaft, of a yielding connecting-rod between the balls of the respective couplers, substantially as shown and described.

2. In combination with the ball-and-socket couplers C B, the automatically-yielding connecting-rod D, substantially as shown and described.

3. The combination, with shafts A A', each provided with a ball-and-socket coupling device, of a connecting-rod, D, between the couplers, constructed and arranged to take up the longitudinal vibrations or end-thrusts of said shafts, substantially as set forth.

4. In combination with the ball-and-socket coupler, a key or keys therefor interposed between the ball of the coupler and a spring-sustained plug arranged in the rim of the socket of said coupler, substantially as shown and described.

5. In combination with ball C, socket B, and the key or sphere E, resting partly in recess $c$ of ball C and in cup F, which has a surrounding spring, $f^2$, and held in position within opening $c'$ by nut or plug $b'$, substantially as shown and described.

In testimony whereof I have hereunto set my hand this 11th day of March, 1882.

FRANCIS O. DESCHAMPS.

Witnesses:
CHAS. F. VAN HORN,
S. J. VAN STAVOREN.